April 26, 1932.  D. G. MACKENZIE  1,855,860
DOOR FOR MOTOR CARS OR LIKE VEHICLES
Filed March 7, 1931   4 Sheets-Sheet 1

INVENTOR.
D. G. Mackenzie
By E. J. Featherstonhaugh
ATTORNEY.

April 26, 1932.　　　D. G. MACKENZIE　　　1,855,860
DOOR FOR MOTOR CARS OR LIKE VEHICLES
Filed March 7, 1931　　　4 Sheets-Sheet 3

April 26, 1932. D. G. MACKENZIE 1,855,860
DOOR FOR MOTOR CARS OR LIKE VEHICLES
Filed March 7, 1931 4 Sheets-Sheet 4

INVENTOR.
D. G. Mackenzie
E. J. Fetherstonhaugh
ATTORNEY.

Patented Apr. 26, 1932

1,855,860

UNITED STATES PATENT OFFICE

DONALD GORDON MACKENZIE, OF MONTREAL, QUEBEC, CANADA

DOOR FOR MOTOR-CARS OR LIKE VEHICLES

Application filed March 7, 1931, Serial No. 520,768, and in Great Britain April 11, 1930.

The present invention relates to improvements in or relating to doors for motor-cars or like vehicles. The usual construction of door hinged at the side has the disadvantage, which is particularly apparent in low roofed vehicles, that in stepping into the car the driver or other party has to stoop below the level of the roof and the principal object of the present invention is to provide an arrangement for hinging doors by which the amount of stooping necessary can be reduced.

A further object of the invention is to provide an arrangement by which the distance which the door of the car, when open, extends from the car itself can be reduced to less than the actual width of the door.

According to this invention the door is pivoted on a horizontal axis preferably near the longitudinal centre of the roof in such a manner that its direction of opening is by movement in an upward direction.

In a preferred form of carrying out the invention the roof of the car is provided with a central beam having plates supported at each end to which hinges are fitted, the other side of the hinge being connected to the door which forms part of the roof and the side of the car and extends to the floor. The movement of the door is controlled by springs which serve to a large extent to counterbalance its weight so that it can be lifted easily and yet when it is replaced it can be readily slammed shut after it has been lowered a certain distance.

One form of carrying the invention into effect is shown, by way of example, in the accompanying drawings in which.

Figure 1:
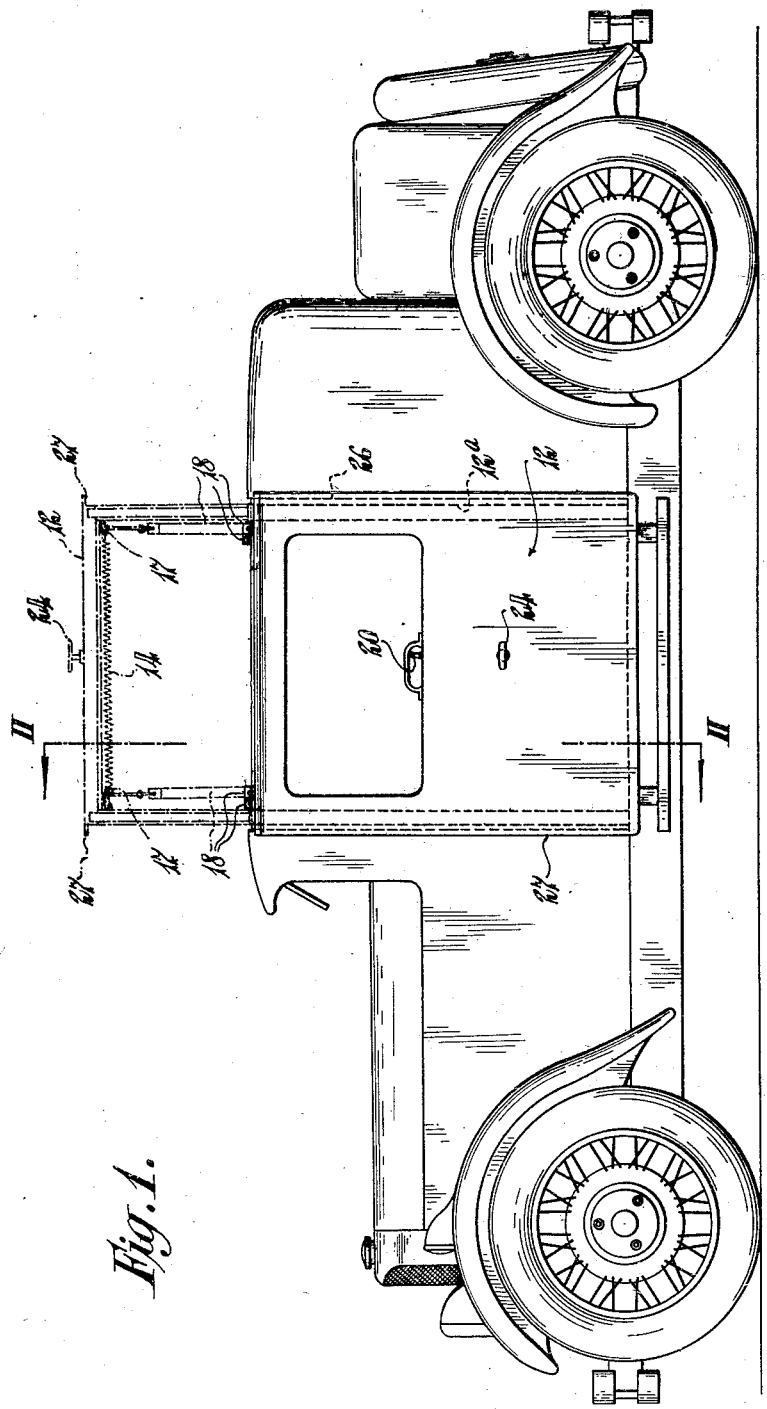
Fig. 1 is a side elevation of a motor vehicle showing the door in the shut position in full lines and in the open position in chain dotted lines.
Figure 2:
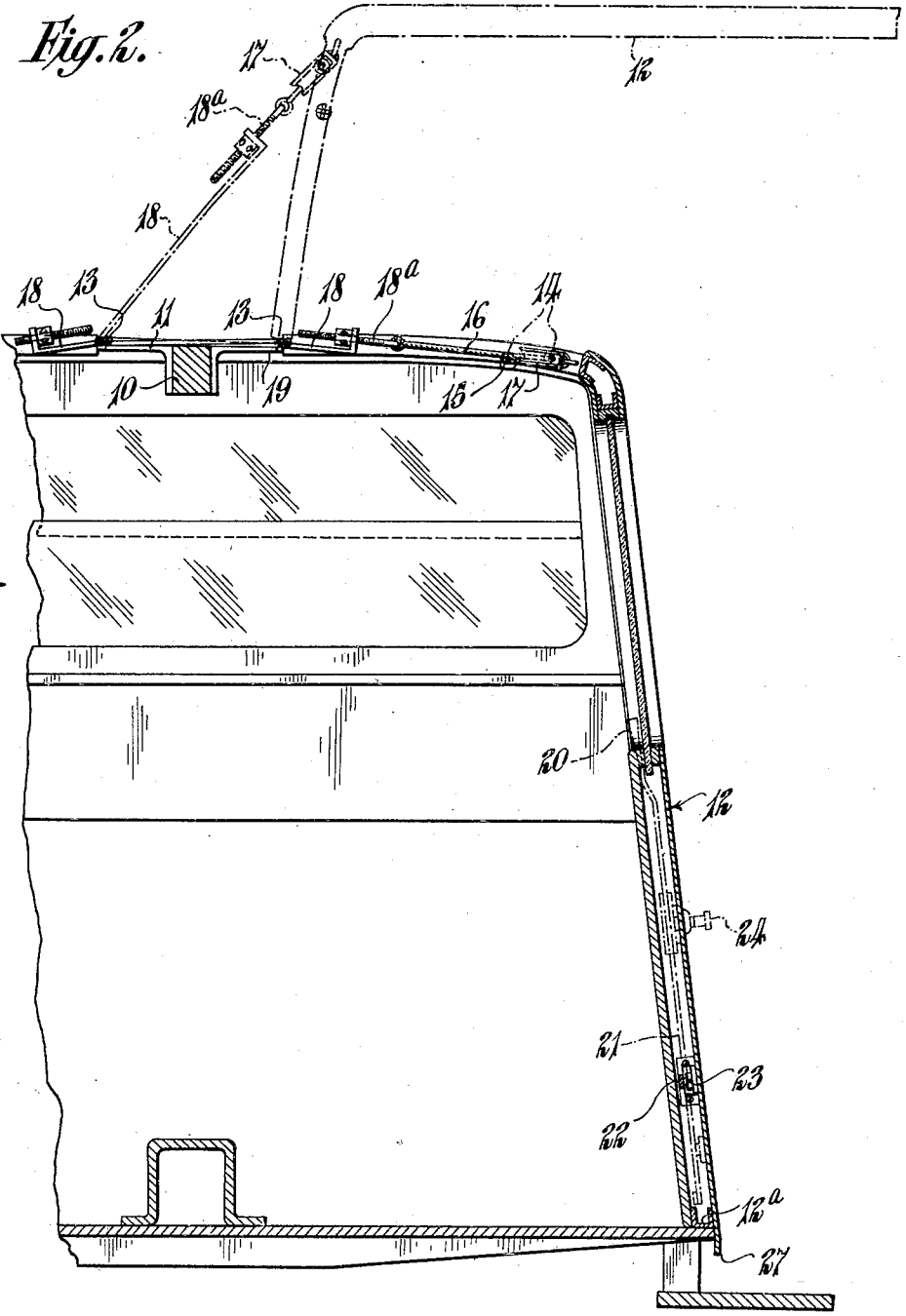
Fig. 2 shows a cross sectional view of the vehicle body taken on line II—II of Fig. 1.
Figure 3:
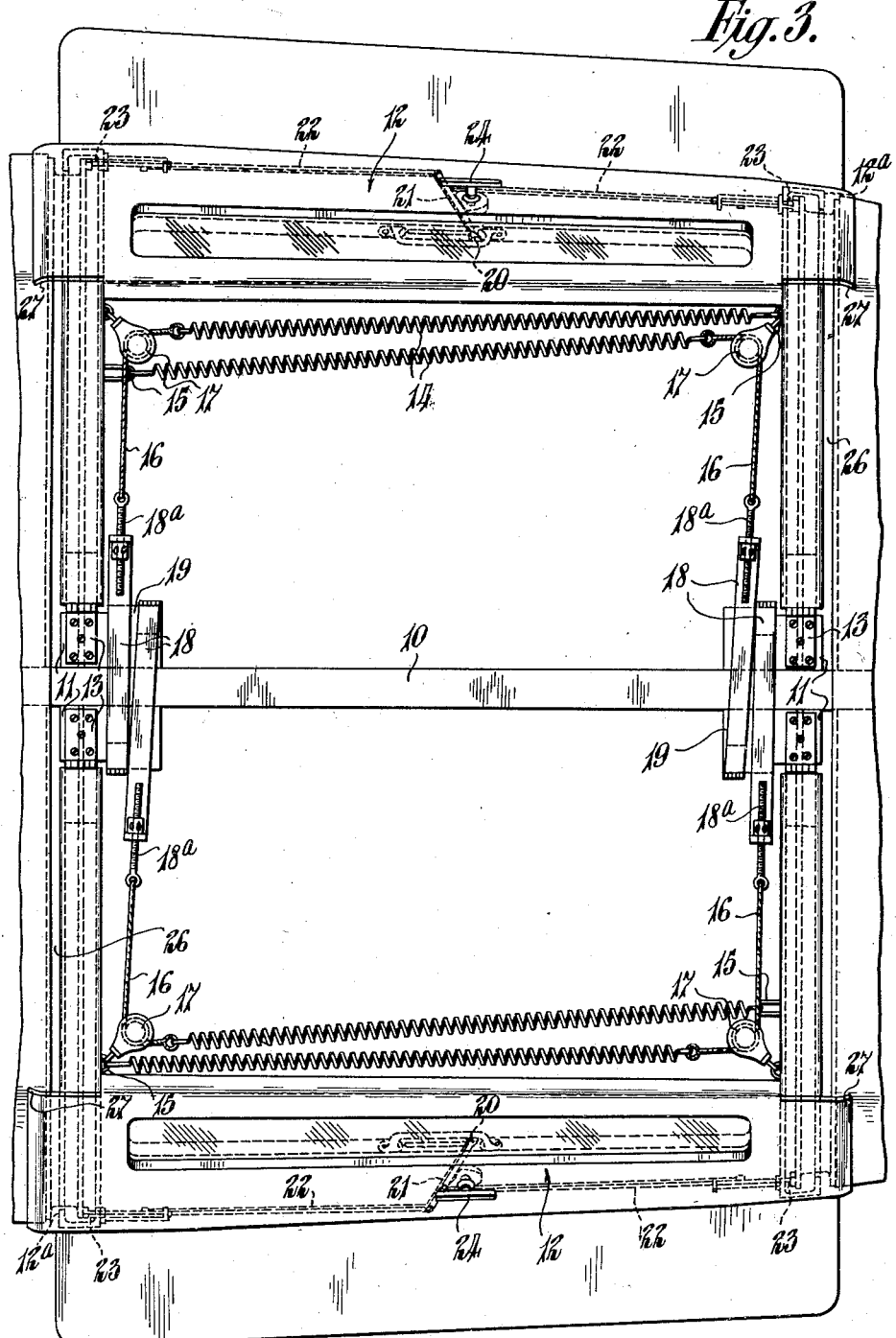
Fig. 3 is a plan view showing the arrangement of the controlling mechanism for two oppositely positioned doors.

Referring to Figs. 1, 2 and 3, the roof of the vehicle body is provided with a central beam 10 having horizontal plates 11 secured thereto or formed integral therewith. The plates 11 serve to support the door 12 which is attached to the former by means of hinges 13. The frame of the door 12 is shaped substantially as an inverted L constructed from U-section metal. Consequently it forms part of the roof when shut and extends from the central roof beam 10 to the floor of the vehicle as shown in Fig. 1.

The controlling mechanism for each door includes two long helical springs 14, each of which has one end secured to a hook 15. These hooks 15 are provided on the inner faces of the opposite sides of the door frame 12. The springs are thus positioned adjacent to the angle of the L-shaped door and have their opposite ends secured to cords or cables 16 which pass round pulleys 17 and are adjustably secured by screwed tensioning eyelets 18a to hinged straps 18. The latter are attached to brackets 19 which are mounted on the central beam 10 adjacent to the plates 11 but extending on the opposite side of the longitudinal centre of the car relative to the plates to which the door is hinged. The springs 14 are adjusted, by the threaded adjusting means above described, to be normally under tension which tensile force is not operative when the roof portion of the door is in or near the horizontal position, i. e. when the door is shut or approaching the shut position. It will be appreciated, however, that when the door is moved about its hinges in an upward direction, the roof part thereof rises towards the vertical. The hinged straps 18 also rise about their pivotal points and so apply the tensile force of the springs 14 in a line passing through the roof portion of the rising door, as shown in thin dotted outline in Fig. 1. Thus, it will be seen, as the door is pushed upward about its hinges, the springs are enabled to exert a force which overcomes the weight of the door and, independently from the initial opening force, lifts it until fully open, in which position the roof portion lies in a substantially vertical plane and the side of the door is horizontal. Since, in the type of vehicle which it is proposed to construct, the width of the door or doors will be greater than the height thereof, it is obvious that, by this manner of opening, the door when in the open position will not project so far from the vehicle body as would be the case if it were hinged for instance at the side of the roof.

In shutting the door, the effect of the springs naturally becomes less as the door is drawn downwards until, when the roof portion is sufficiently advanced toward the horizontal position, the force of the springs is not applicable and the weight of the door causes it to slam closed.

The roof portion of the door could be left uncovered as shown in the drawings so as to leave the roof of the car open as is provided in certain designs of vehicle bodies. The open spaces could be covered with weatherproof fabric, in any convenient manner, in common with the remainder of the roof, and would be arranged so as to fold when the doors were opened. Any method well known in the art could be used for doing this and for the sake of clarity the fabric has not been shown in the drawings.

With the type of door according to the invention a slight modification is necessary in the locking arrangements, to enable the bolts of the door to be positioned at the furthest point possible from the pivot of the former, that is to say, near the floor of the vehicle.

According to one method of achieving this (Fig. 3) the lock handle 20 is connected to a bar 21 pivoted near the base of the door and which has connecting links 22 pivotally secured at equal distances from, but on opposite sides of, the bar pivot. The connecting links 22 engage door locks or bolts 23, of the usual type, of which, in this case, two are provided situated on opposite sides of the door and engaging the door surrounds or sills in the usual manner.

A door handle 24 is provided approximately in the centre of the door panel and actuates suitable cam-mechanism to operate the locks from the outside of the car. To open the door from inside, all that is necessary, therefore, is to operate the handle 20 to retract the lock bolts and to give the door a sufficient upward thrust to enable it to come under the control of the springs 14 and so automatically lift the remaining distance.

Figure 4:
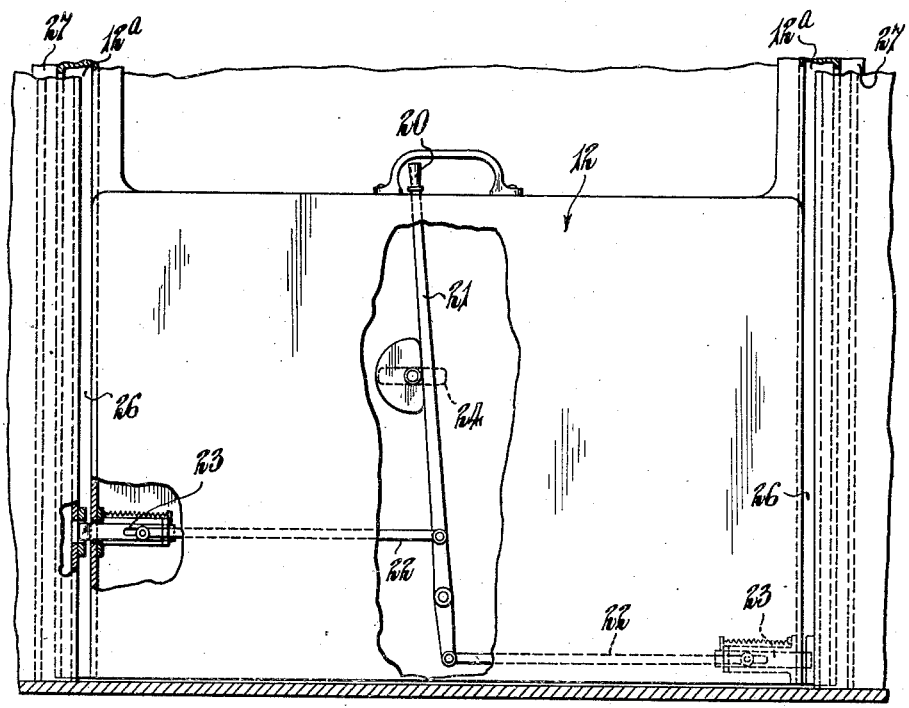
Fig. 4 is a detail view, drawn to a larger scale, showing a suitable locking arrangement for a door of this type.
Figure 5:
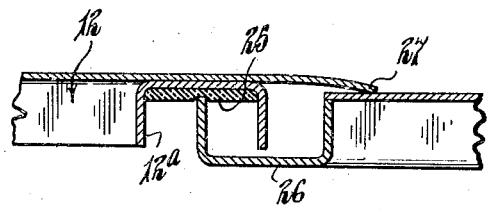
Fig. 5 shows, also drawn to a larger scale, the weatherproof constructional arrangement of the door and door surround.

Particular care has been taken, in evolving a practical form of this invention, to prevent leakage around the frame of the door and thus render the latter, when shut, both weatherproof and draught-proof. To this end the door frame 12a, as above described, is formed of U-section metal and the surround or sill 26 for the door also formed of metal of similar shaped section, as shown in Fig. 4. The adjacent limbs of the door frame and door-surround are arranged to interengage when the door is shut and the shape of the surround enables it to function as a gutter to carry off the water which may creep into it. In this case the fabric covering the door would extend over the edges of the latter to form a covering over-lap 27 which would shield the interengaging edges of the door and sill from the direct drive of rain or other moisture.

A strip of weatherproof fabric 25 would be attached to the inner side of the door frame 12a to provide a seating for the engaging limb of the door sill 26. By this means the engaging surfaces would be completely sealed and at the same time provided with an efficient anti-rattle device.

It will be appreciated from the above description that by means of the invention an arrangement has been provided which enables a person to enter a vehicle without stooping to the same extent which is necessary with a car equipped with doors of standard type; secondly it has the advantage that the door of a low built vehicle when fully open does not extend from the side of the vehicle to the same extent as a door hinged in the usual way.

I claim:

1. A motor car or like vehicle body, comprising, in combination, a central roof beam, a door, horizontal hinges for attaching said door to said beam and tensioned helical springs anchored to said door and arranged to control the opening of the latter in an upward direction.

2. A motor car or like vehicle body comprising in combination a roof beam, a door, horizontal hinges attaching said door to said beam, helical springs attached at one end to the upper part of said door, pivotal straps secured to said beam, and means for securing the opposite ends of said springs to said straps.

3. A motor car or like vehicle body comprising in combination a roof beam, a door shaped substantially as an inverted L, hinges attaching said door to said body, helical springs attached at one end to said door adjacent the angle thereof, pivotal straps attached to said beam, screwed adjustable eyelets mounted on said straps, pulleys at the corners of said door, and flexible cables passing round said pulleys and securing said eyelets and straps to said springs in an adjustable manner.

4. A motor car or like vehicle body comprising in combination a roof beam, a door frame constructed from U-section metal, a door-surround constructed from U-section metal, and horizontal hinges for attaching said door to said beam in such a manner that said door frame interengages with said door-surround in a weatherproof manner.

5. A motor car or like vehicle body comprising in combination, a roof beam, a door frame constructed from U-section metal, a door-surround constructed of U-section metal, a fabric overlap around edges of said door-frame, horizontal hinges to secure said door to said beam in a position enabling said door frame and said door-surround to interengage so that the fabric overlap forms a weatherproof shield.

6. A motor car or like vehicle body comprising in combination, a roof beam, a door frame constructed from U-section metal, a door-surround constructed from U-section metal, a fabric strip inserted into the framework of said door and horizontal hinges for attaching said door to said beam in a manner enabling one part of said door-surround to enter the U-shaped door frame and engage the fabric strip.

7. A motor car or like vehicle body comprising in combination, a roof beam, a door, horizontal hinges for attaching said door to said beam, locking bolts positioned at the lower end of the door and a single controlling means for operating said bolts.

8. A motor car or like vehicle body comprising in combination a roof beam, a door, horizontal hinges for attaching said door to said beam, locking bolts positioned at the lower end of said door, a handle for said lock, a downwardly extending rod attached to said handle and pivoted at its lowed end to the door, connecting links secured to said bolts and pivoted to the said rod at opposite and equidistant points from the pivot of said rod.

9. A motor car or like vehicle body comprising in combination a roof beam, a door, horizontal hinges for attaching said door to said beam, locking bolts positioned at the lower end of said door, a handle for said lock, a downwardly extending rod attached to said handle and pivoted at its lower end to the door, links connecting said locks to said rod, a door handle, and cam mechanism operated by said door handle to engage the said rod and operate the locks.

10. A motor car or like vehicle body comprising in combination a roof beam, a door, horizontal hinges for attaching said door to said beam, spring-actuated lifting means for said door, means for holding said door in the open position, means for locking said door near the lower end thereof, means for controlling said locking means from a point substantially midway of said door, and weatherproof devices for the edge of said door.

11. A motor car or like vehicle body comprising in combination a central longitudinal roof beam, a door shaped substantially as an inverted L pivoted to said beam, spring-actuated counter-balancing mechanism secured to said beam and the upper portion of said door, a door-surround of U-section metal, means for interengaging said door with said door-surround, means for weatherproofing said engaging members, an anti-rattle device attached to said door frame, locking bolts at the lower end of said door and controlling means for said bolts.

In testimony whereof I affix my signature.
DONALD GORDON MACKENZIE.